Figure 1:
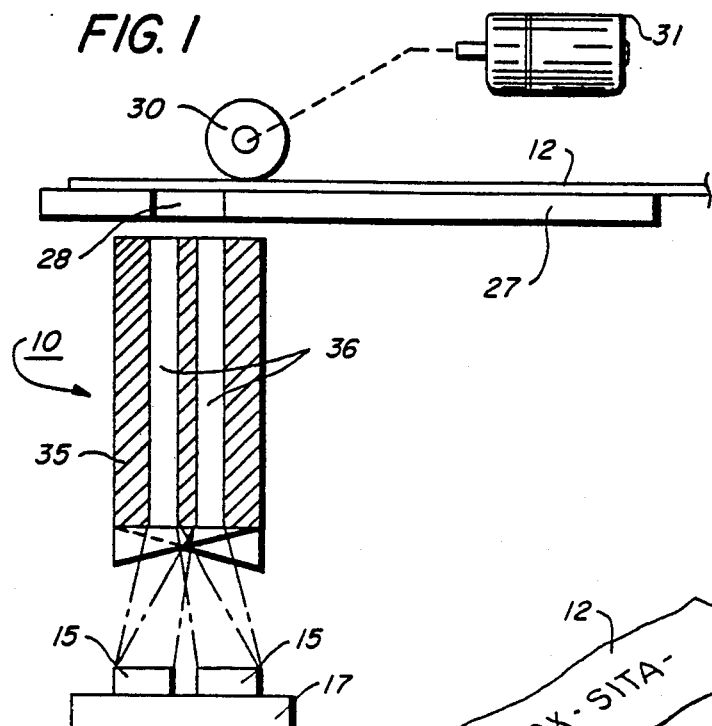

United States Patent

Araghi

[11] Patent Number: 4,509,826
[45] Date of Patent: Apr. 9, 1985

[54] OPTICAL IMAGE STAGGERING/DESTAGGERING ARRANGEMENT FOR MULTIPLE ARRAY SCANNING SYSTEM

[75] Inventor: Mehdi N. Araghi, Webster, N.Y.

[73] Assignee: Xerox Corporation, Stamford, Conn.

[21] Appl. No.: 484,092

[22] Filed: Apr. 11, 1983

[51] Int. Cl.³ .......................... G02B 5/04; G02B 5/17; G02B 17/00
[52] U.S. Cl. ................................ 350/286; 350/96.27; 350/574
[58] Field of Search ............... 355/1, 14 TR; 350/574, 350/576, 96.27, 167; 358/285; 250/227

[56] References Cited

U.S. PATENT DOCUMENTS

| 2,855,819 | 10/1958 | Luboshez | 350/286 X |
|---|---|---|---|
| 3,120,125 | 2/1964 | Vasel | 250/227 |
| 3,677,651 | 7/1972 | Herriott et al. | 350/286 |
| 3,794,411 | 2/1974 | Gray | 350/286 X |
| 3,814,853 | 6/1974 | Lardeau | 178/7.85 |
| 3,906,220 | 9/1975 | Delingat | 250/227 |
| 4,005,285 | 1/1977 | Price | 250/208 |
| 4,009,388 | 2/1977 | Seachman | 250/208 |
| 4,074,142 | 2/1978 | Jackson | 250/551 |
| 4,114,037 | 9/1978 | Westwood | 250/216 |
| 4,270,047 | 5/1981 | Mochizuki et al. | 250/216 |
| 4,288,819 | 9/1981 | Williams | 358/226 |
| 4,317,137 | 2/1982 | Tompkins | 358/285 |

FOREIGN PATENT DOCUMENTS

| 3031295 | 8/1980 | Fed. Rep. of Germany . |
| 3031294 | 8/1980 | Fed. Rep. of Germany . |
| 233323 | of 1925 | United Kingdom ............... 350/286 |

OTHER PUBLICATIONS

Keller et al., "Multible-Channel Optical Reader", IBM Technical Disclosure, vol 17, No. 12, May 1975.

*Primary Examiner*—John K. Corbin
*Assistant Examiner*—David Lewis
*Attorney, Agent, or Firm*—Frederick E. McMullen

[57] ABSTRACT

An arrangement for optically creating a full width scanning array from a plurality of small scanning or writing arrays. The small arrays are disposed in alternating staggered relation in two parallel rows on a substrate with the array viewing fields overlapping to prevent discontinuity. The substrate bearing the arrays is placed in optical relation with an array of fiber optic lenses which transmit an image line to or from the arrays. A biprism array composed of plural prisms, one for each smaller array, is located between the substrate bearing the arrays and the lens array. To destagger the separated scanning arrays and produce a single uninterrupted full width scanning array, alternate ones of the prisms in the biprism array are reversed.

5 Claims, 2 Drawing Figures

OPTICAL IMAGE STAGGERING/DESTAGGERING ARRANGEMENT FOR MULTIPLE ARRAY SCANNING SYSTEM

The invention relates to scanning arrays, and more particularly to a full width scanning array derived from a plurality of smaller scanning arrays.

In order to read or write one complete document line at a time, a full width sensor or emitter array is desired. But this requires that the physical size of the array be equal to or nearly equal to the length of the document line to be processed. Typically, in arrangements of this kind, 1:1 imaging optics, which may be in the form of an array of lens fibers, is provided to focus and transmit the image rays to or from the sensor or emitter as the case may be. However, creation of a full width array sufficient to accommodate the typical document or copy sheet size, ie, 8¼" has presented problems to the art and there is currently to known commercially available full width array in existence.

While the art has considered various ways for producing large full width arrays, such as physically butting several smaller arrays end-to-end, the problems presented have been such that so far creation of a commercially acceptable large full width scanning array have been stymied. One method suggested for overcoming this problem is to forego attempts to assemble shorter arrays end to end and instead arrange plural shorter arrays so that the array viewing fields overlap. Then, electronically regulate scanning operation of the several arrays so that scanning is achieved in effect by jumping from one array to the next while in the overlap region without the loss of image pixels. While the aforementioned electronic system is effective, it is nevertheless relatively complex and expensive, and a simpler, less expensive way to provide full width scanning remains a highly desirable objective.

The invention seeks to provide a relatively simple, inexpensive answer to the problem of providing a full width scanning array from a plurality of discrete smaller scanning arrays, the invention comprising, in combination: an array of individual lens elements disposed between an image plane and an object plane to project at least one image line therebetween; a plurality of relatively short scanning arrays at one of the image and object planes arranged in two discrete rows, the arrays in each row being separated from the next succeeding array in the row by a distance no greater than the length of the array with the arrays of the first row being axially offset from the arrays of the second row whereby the arrays form a periodically disconnected scan line pair; and a prism element associated with each of the arrays and disposed between the lens array and the scanning arrays, the prism elements being arranged in a row with each succeeding prism reversed whereby to merge the disconnected scan line pair into a single continuous image line for transmission by the lens array.

IN THE DRAWINGS

Figure 2:
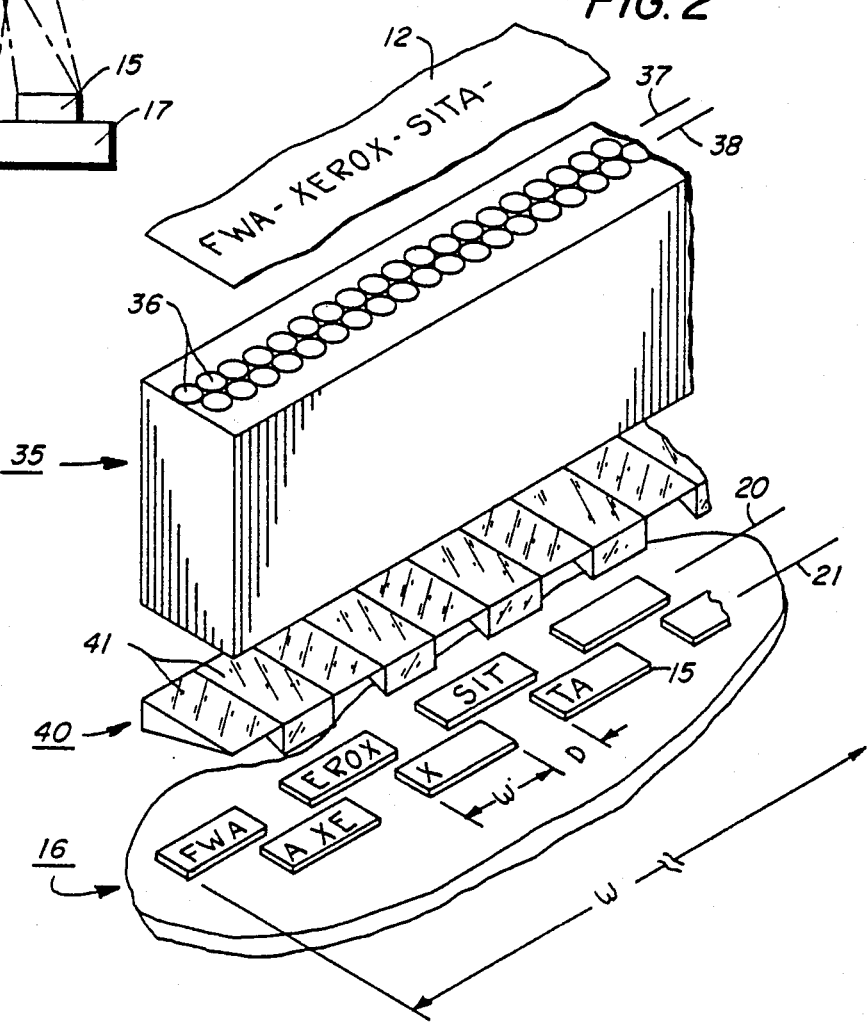

FIG. 1 is a side view illustrating an exemplary raster input scanner incorporating the full width scanning array of the present invention; and FIG. 2 is an exploded isometric view showing details of the scanner together with the full width scanning array of the present invention.

Referring to FIGS. 1 and 2 of the drawings, there is shown a raster input scanner, designated generally by the numeral 10, incorporating the full width scanning array structure of the present invention. The exemplar scanner 10 serves to scan document originals 12 line b line and convert the document image to electrical si nals or pixels. The pixels produced by scanner 10 ma be output to a suitable user such as a printer, or to storage device or memory, or to a data communicatio channel for transmission to a remote site, etc. As will t understood by those skilled in the art, suitable circuitr (not shown) may be provided for processing and er hancing the pixel output.

While scanner 10 is illustrated as a raster input scar ner, scanner 10 may alternately comprise a raster outpt scanner as will appear more fully hereinafter.

A plurality of relatively short scanning arrays 1 which as will appear are optically combined to form composite full width scanning array 16 are provided Arrays 15 may for example comprise Charge Couple Devices (ie CCDs) such as Fairchild Model No. 121 1 CCDs. As will be understood, each array 15 incorpc rates a plurality of image sensors which are normall arranged in a single row or linear array. The sensor respond to image rays striking the sensors to provid electrical signals or pixels, the potential of which i representative of the image grey level. substrate or bas 17, arrays 15 being arranged in two parallel rows 20, 21 Each row 20, 21 of arrays 15 is composed of a sufficier number of small arrays 15 to provide, in cooperatio with the other row, a composite scanning array 16 wit an effective scanning width W (in the scan or X direc tion) equal to the maximum width of the documer original 12 that is desired to be handled. The arrays 1 that make up each row 20, 21 are arranged in end to en relationship, each array 15 being spaced from the end c the neighboring array in the row by a distance (D slightly less than the effective scan width (W') of th arrays 15. The position of the arrays 15 of row 20 ar offset or staggered relative to the arrays 15 of row 21 s that the viewing fields of the arrays of one row span c bridge the space (D) between the arrays of the othe row. By optically merging the viewing fields of th arrays of one row with the arrays of the other row, composite scanning array 16 is formed with overlar ping array portions at the juncture of the viewing fiel of one array with the other.

A suitable document support or platen 27 is provide for the document original 12 to be scanned, platen 2 having a scan slit or aperture 28 thereacross throug which the document original 12 is scanned by the arra 15 that form the composite full width scanning array 1 line by line. The scanning width of scan slit 28 (in th scan or X direction) is preferably made equal to c greater than the maximum width of the document orig nal 12 to be handled. In the exemplary arrangemer shown, a document feed roll 30, which is suitably cot pled to and driven by step motor 31, is provided fc stepping the document original 12 along platen 27 an across scan slit 28. Feed roll 30 is supported for rotatio by suitable journaling means (not shown) in operativ relation with platen 27 adjacent scan slit 28, the peripl ery of roll 30 and the surface of platen 27 cooperating t form a nip for feeding the document 12 to be scanne across scan slit 28. Other arrangements for establishin scanning movement between the document original 1 and the scanning arrays 15 may be envisioned.

A linear lens array 35 composed of a plurality c discrete lens fibers 36 such as gradient optical fibers, disposed between the arrays 15 and platen 27. Optic:

fibers of the type referred to herein are produced under the trademark "SELFOC", registered in Japan and owned by Nippon Sheet Glass Co., Ltd. The operating width of lens array 35 (in the scan or X direction) is preferably at least equal to the width (W) of the scan slit 28, lens array 35 being disposed opposite to and parallel with scan slit 28 to transmit image rays from the document original being scanned to arrays 15 as will appear. Lens fibers 36 are arranged in two parallel rows 37, 38, the centerlines of the lens fibers of one row being offset from the centerlines of the lens fibers of the other row to increase packing density. Preferably, the number of lens fibers 36 in each row of lens array 35 is equal to the total number of sensors provided by the arrays 15.

To enable the parallel rows 20, 21 of arrays 15 to be optically merged with one another to form the composite scanning array 16, a biprism array 40 composed of a series of optical prisms 41 are provided between the lens array 35 and scan arrays 15. The width dimension of each prism 41 is at least equal to the effective width of the array 15 associated therewith. Preferably, prisms 41 are integral with lens array 35 with alternate ones of prisms 41 being reversed to collect and transmit the image rays to the array 15 in the row 20, 21 associated therewith. As a result, the scanning arrays of each row 20, 21 have viewing fields which overlap adjoining scanning arrays of the other row 21, 20, the arrays being optically integrated (ie, destaggered) to form a single composite full width scanning array 16.

When scanning or reading a document original 12 on platen 27, the image of each point is the resultant of contributions from several of the lens fibers 36. Consequently, the presence of sharp boundaries between adjoining prisms 41 of the biprism array 40 do not greatly affect the imaging function, except for a gradual intensity fall-off of the image at the boundary areas of the scanning arrays viewing fields. However, since the image of the areas of the document line being scanned near the boundary between prisms appears on both of the adjoining scanning arrays 15 in rows 20, 21, the energy sum of these doubly imaged areas is substantially equal to the signal produced by the other sensors in the arrays 15 which are exposed to a single image only.

The prisms 41 that comprise biprism array 40 need not be of very high quality optical material and may for example be economically manufactured by injection molding or casting techniques, or by selective grinding of lens elements or lens fiber material, etc., and fusing the prisms together to form the array 40. The principal requirements for prisms 41 are reasonable accuracy and uniformity of the wedge angle, and a high optical transmission of the prism material. Surface finish of the prisms 41 has only a minor effect on performance because of the position of the prisms in the optical system.

Alignment of the short scanning arrays 15 in the system may be effected in a number of suitable ways. For example, scanning arrays 15 having sensors which are several times longer in the cross scan or Y direction than in the scan or X direction may be conveniently used. After the arrays 15 are roughly positioned on base 17, a photosensitive coating is applied to the assembly and the required aperture is located by optically projecting a test scan line through the lens/biprism arrays 35, 40 and formed by photolithographic processing. Where the size of the scanning array sensors is not larger in the cross scan direction than in the scan direction, direct viewing through the lens/biprism arrays 35, 40 respectively will allow in site alignment of the scanning arrays 15. As another option, the support or framing structure (not shown) for the optical system and the scanning array base 17 can be manufactured in one piece and appropriate alignment edges, ridges, pins, etc. can be accurately formed as by molding on base 17. By placing corresponding complimentary locating marks on the scanning arrays 15, the arrays can be assembled onto base 17 in proper alignment.

Stitching or crossover from the scanning array of one row to the scanning array of the other row is performed in the overlapping areas of successive array viewing fields. Because the image of areas in the borderline between two neighboring prisms appears simultaneously on two scanning arrays, stitching may be done by simply summing the image signal output of the overlapping sensor pair. For this purpose, the signal outputs of the scanning arrays can be electrically connected in either series or parallel relation.

In one example, a biprism array was made from approximately 6 mm segments of 20° prisms having a thickness (at the thickest point) of 1-2 mm. The biprism array was formed from a cast polyester resin. Images produced through the aforedescribed biprism array together with a SELFOC lens array were found to be essentially identical in quality to the images produced by the SELFOC lens array alone. In the aforedescribed biprism array, the overlap between the viewing fields of adjoining scanning arrays 15 was >1 mm on each side producing, for the particular scanning arrays used, an overlap of 10 pixels with an estimated intensity fall off of 2%.

While the invention has been described in conjunction with scanning arrays and a raster input scanner, it will be understood that emitter arrays, such as discrete arrays of Light Emitting Diodes (LEDs) may be used in place of scanning arrays 15 to generate image rays in response to an image signal or pixel input. In this type of device, termed a raster output scanner, the image rays produced by the emitters pass via biprism array 40 and lens array 35 to a suitable imaging substrate which may be for example comprise the photoconductive member of a xerographic system, it being understood that the photoconductive member would replace platen 27.

While the invention has been described with reference to the structure disclosed, it is not confined to the details set forth, but is intended to cover such modifications or changes as may come within the scope of the following claims.

I claim:

1. An optical system for projecting images between an object plane and an image plane, comprising in combination:
   (a) an array of individual lens elements disposed between said image plane and said object plane to project at least one image line therebetween;
   (b) a plurality of relatively short scanning arrays at one of said image and object planes arranged in two discrete rows, the arrays in each row being separated from one another by a distance no greater than the length of the array with the arrays of said first row being axially offset from the arrays of the second row whereby said arrays form a periodically disconnected scan line pair; and
   (c) a prism element associated with each of said arrays and disposed between said lens array and said scanning arrays, said prism elements being arranged in a row with each succeeding prisms reversed whereby to merge the disconnected scan line pair into a single continuous image line for transmission by said lens array.

2. The optical system according to claim 1 in which said scanning arrays comprise image reading arrays having a plurality of individual image sensing elements for converting image rays from an image original being viewed to image signals.

3. The optical system according to claim 1 in which said scanning arrays comprise image wiring arrays having a plurality of individual image producing elements for generating image rays in response to an image input signal.

4. The optical system according to claim 1 in which said prism elements are integral with said lens array.

5. In a raster scanner having a scan line whereat the object to be scanned is processed, comprising in combination:

(a) a plurality of linear scanning arrays arranged in two parallel rows, said rows being spaced apart with one row on each side of said scan line, the arrays in said rows being separated from one another along the axis of the row with one row offs relative to the other row whereby the arrays of o1 row are between the arrays of the other row, the space between the arrays of each row being r greater than the scan length of the in between arra of the other row whereby said rows of arrays coo erate to form an uninterrupted composite scannir array; and (b) means forming an optical path between said rov of arrays and said scan line including a plurality of optical fibers arranged in two parall rows, the optical axis of said rows of optic. fibers being coincident with said scan line, anc a row of prisms for optically coupling said rows c arrays with said rows of optical fibers and sai scan line, said row of prisms having a prism fc each of said arrays with each prism in said row c prisms being reversed in matching relation wit the arrays forming each of said rows.

* * * * *